United States Patent Office 2,806,026
Patented Sept. 10, 1957

2,806,026
PROCESS OF PREPARING STARCH DERIVATIVES

James W. Evans, Highland, Ind., assignor to American Maize-Products Company, a corporation of Maine No Drawing. Application June 25, 1954,
Serial No. 439,450

6 Claims. (Cl. 260—233.3)

The present invention relates to a product derived from starch which is particularly useful as a base for starch food products such as pie fillings, puddings, and the like. This application is a continuation-in-part of my copending application Serial No. 221,728, filed April 18, 1951, and now abandoned.

This application is based on my discovery that a change takes place in the character of ordinary starch when it is heated with a small amount of an edible, water soluble, non-toxic metallic compound, such as the metallic phosphates, citrates or tartrates. The composition of the starch is so altered by this treatment that the flavor of the starch and food products made with the improved starch is tremendously enhanced and the food product stabilized to give it a longer shelf life.

My invention is best illustrated in connection with Amazo Instant Dessert, the commercial name for a dry, powdered mix with a starch base which is made into pudding by the addition of cold water or milk. Briefly stated, this dry pudding mix is usually made by taking starch derived from waxy maize and modifying it, using the general method described in United States Patent No. 2,328,527, issued September 7, 1943, to Felton and Schopmeyer. The modified starch in slurry form is partially cooked and the slurry is then dried on a steam heated roll where its moisture content is reduced to approximately 4%. A pudding mix is made by pulverizing the starch and packaging it with sugar, salt and flavoring.

In accordance with the present invention, I have found that when a small amount of a water-soluble, non-toxic metal salt such as trisodium phosphate is mixed with starch having a moisture content of no more than about 20% by weight the salt appears to combine chemically with the starch. This is indicated by the fact that in laboratory experiments the addition of trisodium phosphate to commercially dry starch had absolutely no effect on starch characteristics when the mixture was pasted by heating with the usual amount of water required to make ordinary corn starch pudding or blanc mange. However, in a similar experiment in which the amount of water was kept below 20% the salt readily reacted with the starch. This led me to believe that the sodium phosphate was reacting with the alcohol-soluble or lipid components of the starch which are relatively inactive in water. Accordingly a blend of modified starches made from waxy maize and wheat was extracted with ethanol for 30 hours to remove the lipid components and the extracted starch was then precooked, hot rolled and made into a vanilla flavored pudding. This pudding compared favorably with a vanilla pudding made with my improved starch and it is therefore believed that the phosphates may form complexes or phosphitides with the lipid components.

Regardless of the exact mechanism or product which may finally be proven for my discovery, it is a fact that the character of the starch is altered and a series of taste panel evaluations show an overwhelming preference for desserts made with my improved starch over control samples made with ordinary starch.

Certain conditions should be met in carrying out this invention. First, as to the various edible, non-toxic, water-soluble metallic phosphates, citrates and tartrates which I have tried, particularly good results have been achieved with the normal secondary or primary salts of alkali metals. Especially good results have been achieved with sodium and potassium phosphates. The tribasic salts appear to be more effective than the monobasic and the amount of non-toxic, water-soluble metallic salt used should be within the range of 0.2% and 2.0% by weight of dry starch in the initial slurry. I prefer to use between 0.2% and 1.0% of the phosphates, 0.4% and 1.8% of the citrates, 0.8% and 1.4% of the tartrates. To avoid the harsh taste of the reagent itself, the total amount of salt used is preferably kept below 2.5%.

Apparently the water-insoluble salts do not react with the starch and when used alone they are ineffective for my purpose. But I have found that a small amount of water-insoluble alkaline earth metal salt, such as calcium carbonate, may be used in the reaction mixture with advantage. Addition of calcium carbonate along with the reactive salts appears to aid conditions in the reaction mixture so that the reaction proceeds more smoothly and the calcium carbonate counteracts acidity, which helps in the blending of the final pudding mix. The amount of calcium carbonate that I have used in combination with the other reactive salts is between approximately 0.5% and 1.20%. The total amount of salt added to the reaction mixture should not in any case exceed 2.5% in order to avoid the harsh taste of the reagent itself. In this application all percentages are calculated on the basis of the weight of dry starch used in making the initial slurry.

The second consideration involves temperature and the amount of water which may be present at the time of the reaction. The most favorable temperature range for my reaction is above 120° F. and below the temperature at which the starch will decompose. For commercial use the preferable range is approximately 150° F. to 212° F. As previously described, my reaction will apparently only take place when the starch is substantially dry, and I have found the maximum allowable amount of water to be 20%.

The type of starch which may be employed in my invention is not critical and equally good results can be had by using cereal or non-cereal starches. With the non-cereal starches less reagent is used, which is probably due to the fact that these starches have a smaller amount of lipid components than cereal starches.

For the purpose of illustration and in order to point out the best method now known to me of carrying out this invention, the following specific examples are given:

EXAMPLE 1

Amioca, the generic name for starch derived from waxy maize, was modified according to the process described by Felton and Schopmeyer and then made up into a slurry with 0.4% of dry trisodium phosphate, 0.8% of dry calcium carbonate and 65% of carefully purified water. After it was thoroughly mixed, the slurry was pumped through a continuous steam heated cooker and precooked for about a minute at a temperature of 160° F. to 212° F. The slurry was then fed over a hot roll heated with steam at 160 pounds pressure to reduce its moisture content to about 4%. The temperature of the starch slurry on the hot roll was about 212° F. A vanilla flavored pudding mix was made by pulverizing the dried starch and mixing 100 parts of it in a ribbon mixer or the like with 200 parts of cane or beet sugar, 3 parts of salt, 0.2 part of yellow coloring material and 0.7 part of vanilla extract. If desired, an anti-lumping agent, such as polyoxyethylene glycol mono stearate, as described in a copending application Serial No. 360,847, may be included in the mix.

This powdered mix when packaged appears to have an exceptionally long shelf life. The extent of this improvement has not yet been established, but samples of the mix which have been in storage since June 14, 1950, are still in excellent condition.

The actual dessert was made by mixing the packaged powder with about 10 to 12 times its weight of milk. The resulting pudding had excellent flavor and there was none of the starchy flavor which characterizes puddings made with ordinary precooked starch.

EXAMPLE 2

741 parts of waxy corn starch modified as set forth in Example 1 were made up into a slurry with 1000 parts of water and 2.85 parts of trisodium phosphate (approximately 0.38%). The slurry was heated in a continuous cooker to 190° F. in about 30 seconds and then fed over a hot roll heated with steam at 160 pounds pressure to reduce its moisture content to about 4%. The dried product was ground and mixed with sugar, dextrose, salt and flavoring. 4½ ounces of this mixture were added to one pint of cold milk and mixed with an egg beater for 30 seconds. The resulting pudding had excellent flavor.

EXAMPLE 3

600 parts of waxy corn starch, 141 parts wheat starch, 5.7 parts calcium carbonate (about 0.62%) and 2.85 parts of mono sodium phosphate (about 0.38%) were slurried in 1000 parts of water and processed as described in Example 2 above. The resulting pudding had excellent flavor.

EXAMPLE 4

725 parts of wheat starch, 5.8 parts of calcium carbonate (about 0.79%) and 2.9 parts of mono sodium phosphate (about 0.39%) were slurried in 2600 parts of water. This mixture was heated to 185° F. in 45 minutes by use of steam coils. The cooked paste was then fed over a hot roll heated with steam at 100 pounds pressure to reduce its moisture content to about 3%. When compounded as in Example 2 the pudding had excellent flavor.

EXAMPLE 5

Example 4 was repeated using common corn starch in place of wheat starch with the same results.

EXAMPLE 6

500 parts of modified waxy corn starch and 2.1 parts of dibasic sodium phosphate (about 0.4%) were slurried in 1820 parts of water. The mixture was heated to 190° F. in 50 minutes by use of steam coils and then fed over a hot roll heated with steam at 100 pounds pressure to reduce its moisture content to about 3%. The finished product was made up into a dessert as in Example 2 with the same results.

EXAMPLE 7

The procedure of Example 6 was carried out using 3.0 parts of monobasic sodium phosphate (about 0.59%) in place of the dibasic sodium phosphate.

EXAMPLE 8

The procedure of Example 6 was carried out using 2.1 parts of tribasic potassium phosphate (about 0.4%) in place of the dibasic sodium phosphate.

EXAMPLE 9

400 parts of modified waxy corn starch and 3.6 parts of dibasic potassium phosphate (about 0.89%) were slurried in 1420 parts of water. The mixture was processed as described in Example 6 above with the same results.

The procedure described of Examples 1 through 9 were carried out using the phosphates, citrates and tartrates, either alone or admixed with calcium carbonate as specified in the numbered examples (10 through 17) given hereinbelow. In using the ingredients set forth in Examples 10 through 17 the procedure, ingredients and proportions of ingredients described in Examples 1 through 9 were employed exactly as described with the single exception that the phosphates, citrates and tartrates, either alone or admixed with calcium carbonate in the proportions specified in Examples 10 through 17, were substituted for the phosphate and phosphate admixed with calcium carbonate described in Examples 1 through 9. Puddings were then made by thoroughly mixing 4½ ounces of the resulting products of Examples 10 through 17 with a pint of cold milk. The puddings had excellent flavor and no starchy aroma or flavor.

| Example 10 | | Example 11 | |
| --- | --- | --- | --- |
| Monosodium Phosphate | Calcium Carbonate | Disodium Phosphate | Calcium Carbonate |
| Percent | Percent | Percent | Percent |
| 0.25 | -------- | 0.25 | -------- |
| 0.25 | 0.5 | 0.25 | 0.5 |
| 0.5 | -------- | 0.5 | -------- |
| 0.5 | 0.8 | 0.5 | 0.8 |
| 0.6 | 1.2 | 0.6 | 1.2 |
| 1.00 | -------- | 1.00 | -------- |

| Example 12 | | Example 13 | |
| --- | --- | --- | --- |
| Trisodium Phosphate | Calcium Carbonate | Monobasic Potassium Phosphate | Calcium Carbonate |
| Percent | Percent | Percent | Percent |
| 0.25 | -------- | 0.25 | -------- |
| 0.25 | 0.5 | 0.25 | 0.5 |
| 0.4 | 0.4 | 0.5 | -------- |
| 0.4 | 0.4 | 0.5 | 1.0 |
| 0.4 | 1.2 | 1.0 | -------- |
| 0.6 | 1.2 | -------- | -------- |
| 1.0 | -------- | -------- | -------- |

| Example 14 | | Example 15 | |
| --- | --- | --- | --- |
| Dibasic Potassium Phosphate | Calcium Carbonate | Tribasic Potassium Phosphate | Calcium Carbonate |
| Percent | Percent | Percent | Percent |
| 0.25 | -------- | 0.25 | -------- |
| 0.25 | 0.5 | 0.25 | 0.6 |
| 0.5 | -------- | 0.5 | 1.0 |
| 0.5 | 0.9 | 1.0 | -------- |
| 1.0 | -------- | -------- | -------- |

| Example 16 | | Example 17 | |
| --- | --- | --- | --- |
| Sodium Citrate | Calcium Carbonate | Sodium Tartrate | Calcium Carbonate |
| Percent | Percent | Percent | Percent |
| 0.4 | -------- | 0.4 | -------- |
| 0.8 | -------- | 0.8 | -------- |
| 0.8 | 0.5 | 0.8 | -------- |
| 1.2 | -------- | 0.8 | 0.5 |
| 1.4 | -------- | 1.2 | -------- |
| 1.4 | 1.0 | 1.4 | -------- |
| 1.6 | -------- | 1.4 | 1.0 |

In the examples and elsewhere throughout the specification, percentages are calculated on the basis of the weight of commercially dry starch used in the initial slurry.

Taste tests were made using actual desserts containing different proportions of salt and different flavors and compared with identical control samples without the salt of the present invention. Typical taste panel evaluations are as follows:

*Taste test No. 90*

VANILLA INSTANT DESSERT—20 PERSONS TASTED

| Preference | Flavor | Color | Consistency |
| --- | --- | --- | --- |
| Control | 3 | 4 | 6 |
| Present Invention | 16 | 3 | 7 |
| Undecided | 1 | 13 | 7 |

*Taste test No. 91*

BUTTERSCOTCH INSTANT DESSERT—15 PERSONS TASTED

| Preference | Flavor | Color | Consistency |
| --- | --- | --- | --- |
| Control | 1 | 6 | 6 |
| Present Invention | 13 | 0 | 5 |
| Undecided | 1 | 9 | 4 |

Although I have described my invention in connection with Amazo Instant Dessert, it will be clearly understood that the example is intended to give an illustration of the way that the invention can be carried out and is not intended to imply any limitations on the variations that may be employed.

What I claim is:

1. The method of treating starch to enhance its taste characteristics which comprises reacting starch of less than 20% moisture content with approximately 0.2% to 2.0% of an edible non-toxic salt selected from the group consisting of alkali metallic phosphates, citrates and tartrates at a temperature above 120° F. to form a reaction product of the starch and edible non-toxic salt.

2. The method of treating starch to enhance its taste characteristics which comprises mixing into an aqueous suspension of starch approximately 0.2% to 2.0% of an edible non-toxic salt selected from the group consisting of alkali metallic phosphates, citrates and tartrates and heating the resulting mixture at a temperature above 120° F. until its moisture content is below 20% to form a reaction product of the starch and edible non-toxic salt.

3. The method of claim 1 which includes the step of adding between 0.5% and 1.2% of a water insoluble edible non-toxic metallic carbonate to the reaction mixture to counteract acid as formed in the reaction, the total amount of salt being not more than 2.5%.

4. The method of treating starch to enhance its taste charcteristics which comprises mixing into an aqueous suspension of starch not over 2.5% of an admixture comprising between 0.5% and 1.2% of a water insoluble edible non-toxic metallic carbonate and between 0.2% and 2.0% of an edible non-toxic water soluble salt selected from the group consisting of alkali metallic phosphates, citrates and tartrates and heating the resulting mixture at above 120° F. until its moisture content is below 20% to form a reaction product of the starch and edible non-toxic salt.

5. The method of making an improved starch which comprises mixing into an aqueous slurry of starch an admixture comprising about 0.8% calcium carbonate and about 0.4% trisodium phosphate by weight of starch solids in said slurry and heating the resulting mixture at a temperature above 120° F. until its moisture content is below 20% by weight to form a reaction product of the starch and phosphate salt.

6. The method of making an improved starch which comprises mixing into an aqueous slurry of starch an admixture comprising between approximately 0.2% and 1.0% of trisodium phosphate and between approximately 0.5% and 1.2% of calcium carbonate by weight of starch solids in said slurry and heating the resulting mixture at a temperature between approximately 120° F. to approximately 212° F. until its moisture content is below 20% by weight to form a reaction product of the starch and trisodium phosphate.

References Cited in the file of this patent

UNITED STATES PATENTS

| 2,590,912 | Yarber | Apr. 1, 1952 |
| 2,614,945 | Krisan | Oct. 21, 1952 |
| 2,626,257 | Caldwell et al. | Jan. 20, 1953 |

FOREIGN PATENTS

| 70,237 | Switzerland | Sept. 1, 1915 |